United States Patent
Wang et al.

(10) Patent No.: US 8,418,103 B2
(45) Date of Patent: Apr. 9, 2013

(54) NONLINEAR APPROACH TO SCALING CIRCUIT BEHAVIORS FOR ELECTRONIC DESIGN AUTOMATION

(75) Inventors: Xin Wang, Pasadena, CA (US); Alireza Kasnavi, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/193,396

(22) Filed: Jul. 28, 2011

(65) Prior Publication Data

US 2012/0079441 A1 Mar. 29, 2012

Related U.S. Application Data

(60) Provisional application No. 61/385,870, filed on Sep. 23, 2010.

(51) Int. Cl.
*G06F 9/455* (2006.01)
*G06F 17/50* (2006.01)

(52) U.S. Cl. .......................... 716/108; 716/113
(58) Field of Classification Search .................. 716/108, 716/113

See application file for complete search history.

(56) References Cited

U.S. PATENT DOCUMENTS 7,774,176 B2 * 8/2010 Rao et al. .......................... 703/2

OTHER PUBLICATIONS

"CCS Timing Technical White Paper, Version 2.0," Synopsys, Inc., Dec. 20, 2006, 15 pages, [Online] [Retrieved on Nov. 16, 2012] Retrieved from the InternetURL<http://www.opensourceliberty.org/ccspaper/ccs_timing_wp.pdf>.
"PrimeTime® and PrimeTime® SI User Guide, Version G-2012.06" Synopsys®, Jun. 2012, pp. 9-12 to 9-14 and 10-9 to 10-15.

* cited by examiner

*Primary Examiner* — Suresh Memula
(74) *Attorney, Agent, or Firm* — Fenwick & West LLP

(57) ABSTRACT

Circuit behaviors are scaled to different operating conditions by using a generalized nonlinear model. Nonlinear transforms are applied to the operating conditions and/or to the circuit behaviors contained in a library set. The transformed quantities have a more linear relationship between them. Parameters for the linear relationship are estimated based on the data and operating conditions in the library set. These parameters and nonlinear transforms can then be used to scale circuit behaviors to operating points not contained in the library set.

19 Claims, 4 Drawing Sheets

NONLINEAR APPROACH TO SCALING CIRCUIT BEHAVIORS FOR ELECTRONIC DESIGN AUTOMATION

CROSS-REFERENCE TO RELATED APPLICATION(S)

This application claims priority under 35 U.S.C. §119(e) to U.S. Provisional Patent Application Ser. No. 61/385,870, "Nonlinear Approach To Scaling Circuit Behaviors For Electronic Design Automation," filed Sep. 23, 2010. The subject matter of all of the foregoing is incorporated herein by reference in its entirety.

FIELD OF THE INVENTION

The present invention is related to scaling circuit behaviors as part of the electronic design automation (EDA) process. In a common scenario, it relates to using cell libraries that describe the circuit behavior under certain conditions, in order to estimate the circuit behavior under other conditions.

BACKGROUND OF THE INVENTION

As technology progresses, integrated circuits are becoming larger and more complex. They are also becoming more expensive to develop. As a result, the cost of a design error is also increasing, which puts more emphasis on checking the designs before they are fabricated in order to reduce the risk of a design error.

Using timing as an example, it is becoming increasingly important to confirm that an integrated circuit does not violate timing constraints before it is released to manufacturing. However, the increasing size and complexity of integrated circuits, coupled with the increasing stringency of timing requirements, means that it has become necessary to use sophisticated tools to assist in this task. Furthermore, these tools must be optimized for performance and accuracy. Even with current technology, automated timing analysis can take a long time. In addition, overly optimistic results will miss possible design errors and overly pessimistic results will impose unnecessary constraints on the chip design.

One subtask for timing analysis is to estimate a circuit's behavior under specific operating conditions (e.g., at a specific temperature, subject to a specific voltage variation and/or assuming a specific process variation). Since integrated circuit designs are evaluated at many different operating conditions and since a chip contains a very large number of circuits, this subtask is repeated many many times during the course of designing an integrated circuit.

One approach to this subtask is to provide a set of cell libraries, each of which characterizes certain basic circuits (i.e., cells) at a specific operating condition. The library operating conditions often will not match the operating condition of design cell instances because of variations such as environmental, operational, or process variations, so the data in the libraries must be scaled to estimate the circuit's behavior at the operating condition of interest. This is typically done by using a derating factor. The derating factor is a multiplier that is supposed to account for differences between the library operating conditions and the actual operating conditions. For example, if the library is characterized at 1.8V, but the actual voltage for a timing analysis scenario is 1.6V, then a derating factor can be used to adjust the behavior predicted by the library.

However, derating factors are fairly simplistic. They are a fudge factor of sorts which can be sufficient for older process technologies but may not be sufficient as technology progresses, for example in the case of deep submicron processes. For more complex analysis, derating factors typically do not provide sufficiently accurate results. They also have difficulty handling scaling across many operating conditions simultaneously.

Accordingly, there is a need for improved approaches to scaling circuit behavior to different operating conditions.

SUMMARY OF THE INVENTION

In one aspect, circuit behaviors are scaled to different operating conditions by using a generalized nonlinear model. Nonlinear transforms are applied to the operating conditions and/or to the circuit behaviors contained in the library set. The transformed quantities have a more linear relationship between them. Parameters for the linear relationship are estimated based on the data in the library set. These parameters and nonlinear transforms can then be used to scale circuit behaviors to operating points not contained in the library set. In one approach, the parameters are calculated a priori and then accessed for each scaling task, thus avoiding recalculation for each scaling task.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

A preferred embodiment of the present invention is now described with reference to the figures where like reference numbers indicate identical or functionally similar elements. Aspects of the invention will be illustrated using static timing analysis (STA) as an example, but the invention is not limited to STA.

Figure 1:
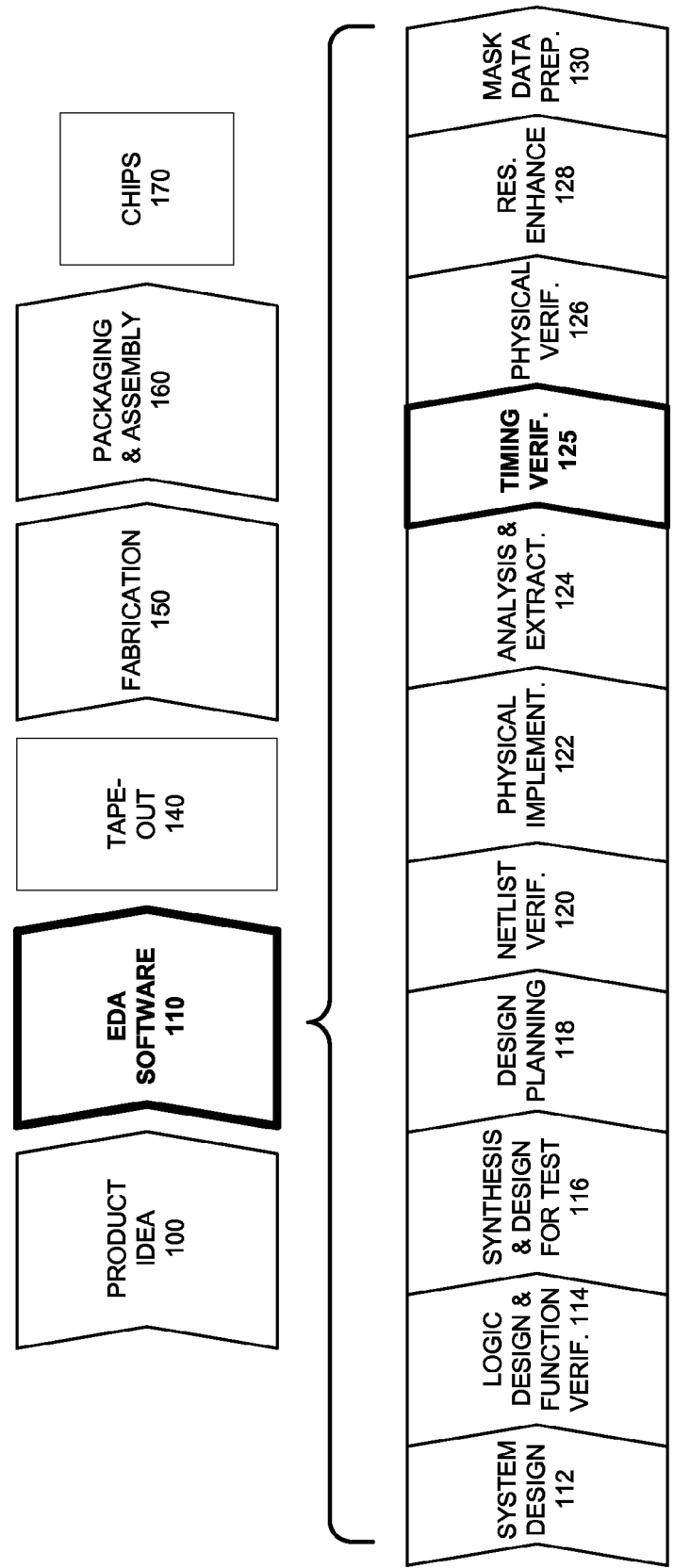
FIG. 1 is a diagram that illustrates the various steps in the design and fabrication of an integrated circuit, including a representative EDA design flow.

FIG. 1 illustrates the various steps in the design and fabrication of an integrated circuit in accordance with an embodiment of the present invention. The process starts with a product idea 100. Next, the product idea is realized by an integrated circuit, the design of which is accomplished using electronic design automation (EDA) software 110. Once the design is finalized, it is taped-out 140. After tape-out, the process goes through fabrication 150, and packaging and assembly 160. The process eventually culminates with the production of physical integrated circuits 170.

The EDA software design step 110, in turn, includes a number of phases. In this example, it includes system design 112, logic design and functional verification 114, synthesis and design for test 116, design planning 118, netlist verification 120, physical implementation 122, analysis and extraction 124, timing verification 125, physical verification 126, resolution enhancement 128, and mask data preparation 130. It will be recognized that different design flows will apply to different chip design projects. Not all of the phases shown in FIG. 1 need be included in every design flow. Conversely, design flows may also includes phases not shown in FIG. 1.

Static timing analysis (STA) typically takes place during the timing verification step 125, in which the netlist of the circuit design is checked for compliance with timing constraints and for correspondence with the VHDL/Verilog source code. Note that the PrimeTime® product from Synopsys, Inc. can be used for STA.

Figure 2:
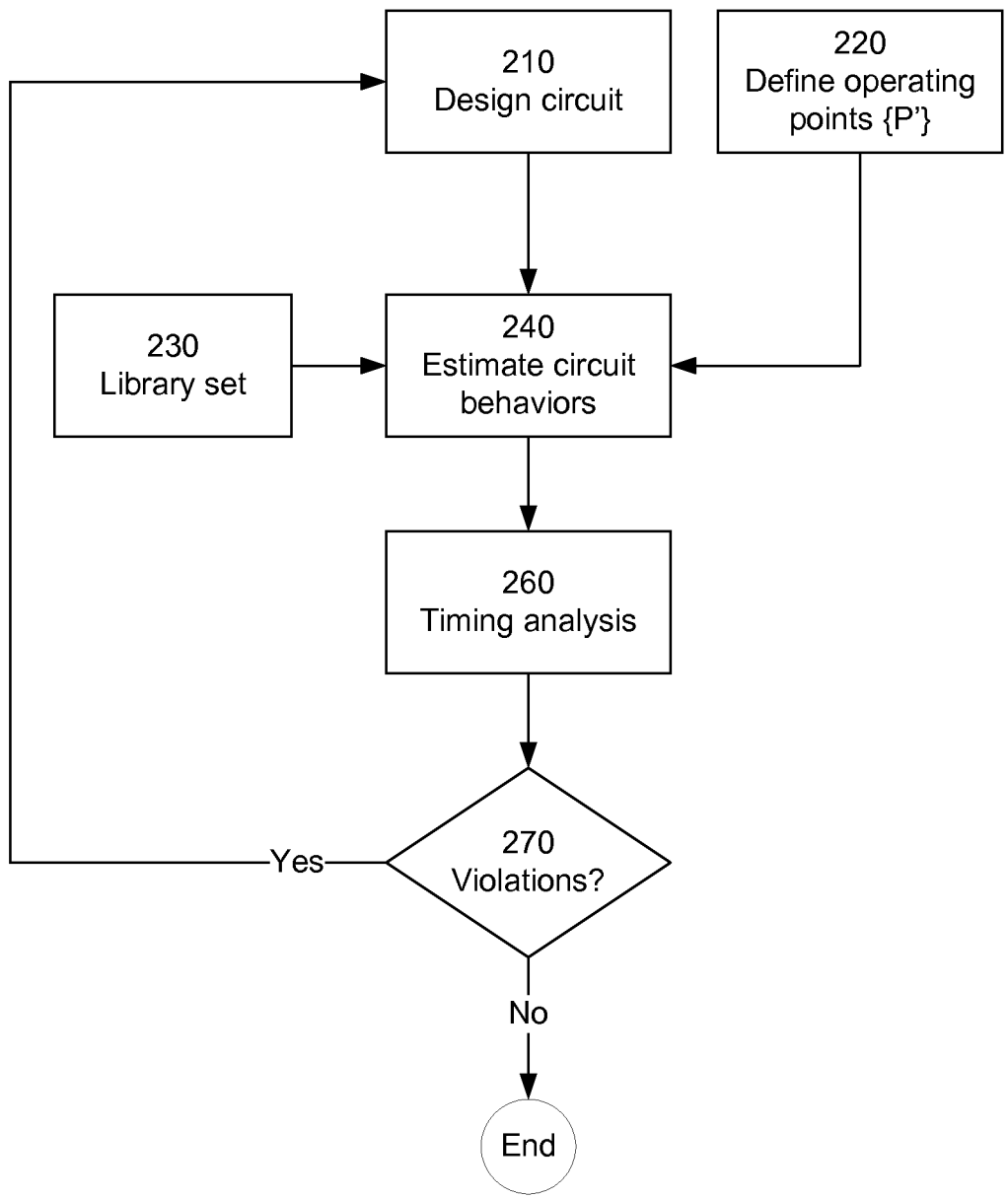
FIG. 2 is a flowchart of one implementation of static timing analysis according to the invention.

STA typically verifies timing by computing the worst-case and best-case delays. FIG. 2 presents a flowchart that illustrates how STA is typically used during the design and implementation of integrated circuits. An integrated circuit is designed 210. STA addresses the question of whether the circuit design will violate any timing requirements during its operation.

The range of possible use scenarios for the integrated circuit is typically addressed by defining 220 a set of different operating points {P'} at which the integrated circuit behavior will be evaluated. Operating points are sometimes referred to as corners or scenarios. Each operating point P is defined by a set or multiple sets of operating conditions $p_j$. Operating conditions may include quantities such as temperature, voltages (including operating voltage of multiple rails), operating signal level (including changes in voltage levels), input signal distortion, input signal skewness in multi-input cell simultaneous switching (e.g., the skew between different inputs for a multi-input pin or N-input gate), silicon-on-insulator (SOI) variation, min-max operating condition variation, stress effect variation (e.g., variations caused by mechanical stress) and process variations. Examples of process variations include channel length, gate oxide thickness, diffusion concentration, and cell metal layer thicknesses and widths. Any variation that can affect the cell behavior could be modeled as an operating condition.

Operating conditions may be defined in different ways: as a specific value, a range of values or a statistical distribution of values, for example. In addition, operating conditions may be constant over an entire chip or region of a chip, or may vary across a chip (e.g., on-chip variations of process parameters). For a library of cells, different operating conditions may apply to different cells. Typically, however, a single library contains many cells characterized at a single operating point, and a set of N libraries is used to provide the characterizations of the cells at N operating points. However, the N operating points usually are not sufficient to adequately characterize the circuit design in question over all of its intended operating conditions.

Returning to FIG. 2, timing analysis estimates the timing behavior of the circuit design 210 for operating points {P'} (although detailed analysis typically occurs only for a subset of all defined operating points). However, the timing analysis typically does not do this by using original transistor model and transistor level simulation to predict the timing behavior at each set of operating conditions. That approach is impractical given the current complexity of integrated circuits and the large number of operating points to be considered. Instead, according to the invention, the circuit behaviors used in timing analysis are estimated 240 based on previously characterized or determined circuit behaviors.

For STA, typical standard cell circuit behaviors of interest include timing, noise, and power behaviors. Examples of timing behavior include propagation time, signal slew and signal waveforms. These behaviors are commonly used in full chip timing, noise, and power analysis to understand the chip behaviors. These behaviors are usually abstracted to certain empirical data-based models. For timing, a commonly used model is the CCS (composite current source) timing model, which can include CCS driver model (when the cell output pin is driving a parasitic net and loads) and CCS receiver model (when the cell input pin is a receiver load driven by another cell). Another commonly used timing model is the traditional nonlinear delay model (NLDM), which can include driver cell delay/slew and receiver pin capacitance. Constraints are commonly used to model registers. DRCs are used to describe design rules (for cells) such as the maximal capacitance load a driver cell output pin is allowed to drive. An example of a noise model is the CCS noise model, which uses I-V response surface to model driver behavior in the present of noise bumps. Nonlinear power model is a commonly used power model that uses internal power, leakage power, and gate-leakage power data to model (standard cell) power behaviors.

In FIG. 2, these previously determined circuit behaviors are contained in a set of libraries 230. Each library has been characterized at an operating point P(n), which shall be referred to as a characterization point. For convenience, the value of a circuit behavior x at operating point P(n) shall be referred to as x(n). Thus, the library set 230 contains values x(n) for a circuit behavior that has already been characterized at characterization points P(n), which may or may not include the desired operating point P'. In step 240, the libraries are scaled to operating point P', thus yielding an estimate x' of the circuit behavior. Since this process will occur many many times during the design of an integrated circuit, it is desirable that the scaling process 240 is runtime efficient.

As a specific example, assume that the circuit design 210 includes an AND gate cell instance, and the behavior of the cell is characterized and stored in cell libraries 230. Further assume that the gate-level timing analysis requires the propagation delay through the AND gate. In the cell libraries, the propagation delay has been estimated for certain characterization points. For example, the characterization points may be defined by the extremes and typical values of the operating conditions: low, high and mid-range temperature; low, high and typical voltage at each rail; and fast, slow and typical corners with respect to process variations. The software tool uses this information to estimate 240 the propagation delay at the specific operating point P' of interest.

Static timing analysis 260 is then performed. If timing violations are found 270, the process goes back to the circuit design step 210 so that the circuit can be modified to fix the timing violations.

Figure 3:
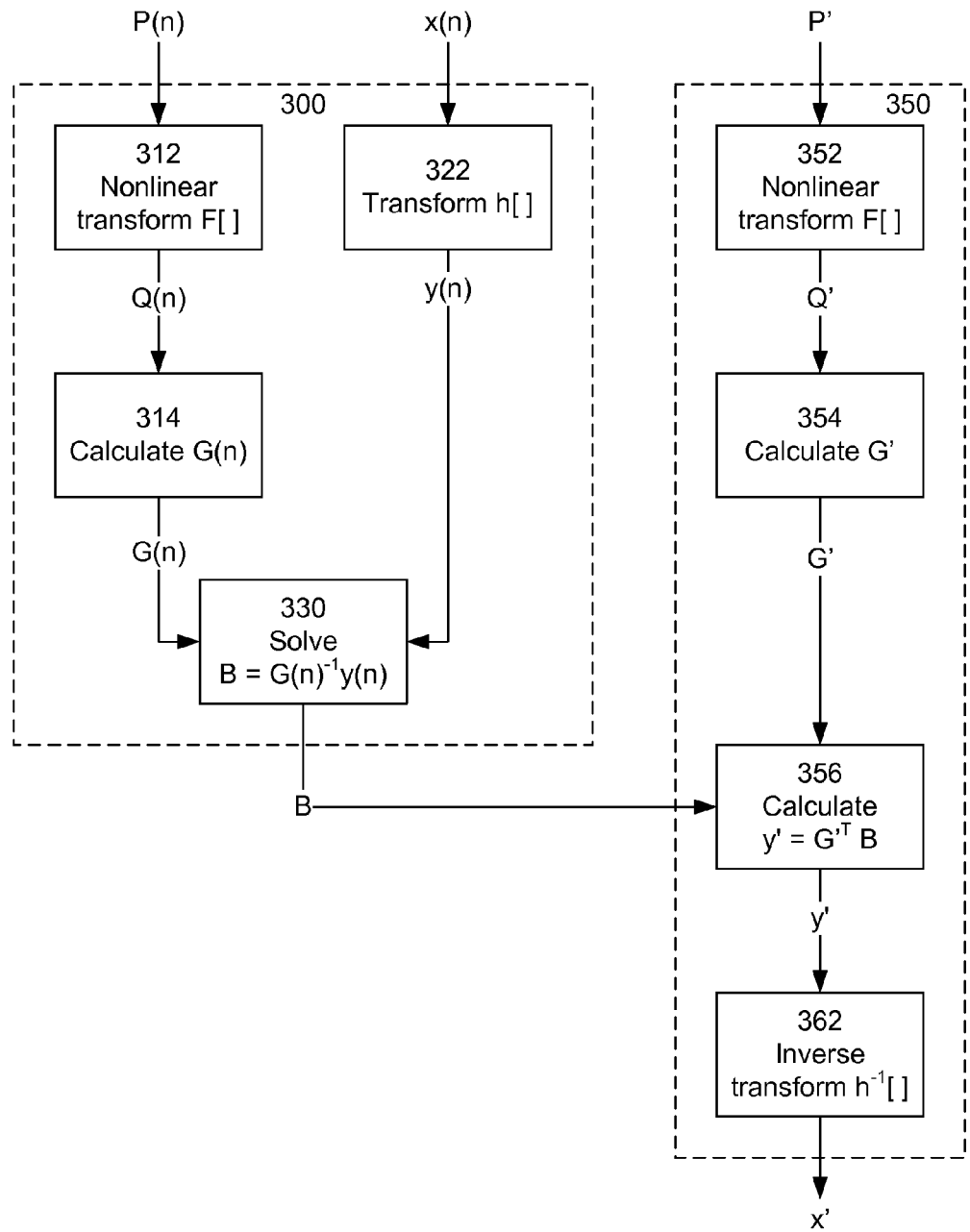
FIG. 3 is a diagram illustrating one approach to estimating circuit behavior according to the invention.

FIG. 3 is a diagram illustrating one approach to the step of estimating 240 circuit behavior according to the invention. This approach can be divided into two phases: Phase 300 uses the library set to estimate a set of coefficients B. Phase 350 then applies the coefficients B to estimate the circuit behavior x' at the desired operating point P'. The following example will consider the estimation of a single circuit behavior x, but it will be apparent that the techniques below can be extended to estimate more than one circuit behavior.

Phase 300 proceeds as follows. The library set contains values of circuit behavior x(n) for different characterization points P(n). A nonlinear transform F is applied 312 to each P(n) to obtain an intermediate result Q(n):

$$Q(n)=F[P(n)] \quad (1A)$$

In this particular example, each characterization point P(n) is defined by a set of operating conditions $\{p_j(n)\}$, and the nonlinear transform F is separable with respect to the $p_j$. That is, $P=\{p_1, p_2, \ldots p_J\}$ and each $p_j$ can be independently transformed to a corresponding component $q_j$ by a one-dimensional nonlinear function f:

$$q_j(n)=f_j[p_j(n)] \text{ for each } j \quad (1B)$$

The intermediate result Q(n) is then the set of $\{q_j(n)\}$: $Q=\{q_1, q_2, \ldots q_J\}$.

The nonlinear functions $f_j$ are preferably chosen to approximately linearize the dependence of the circuit behavior x with respect to the operating conditions $p_j$. This allows the interpolation to achieve better accuracy. For example, assume a behavior x of the circuit is an exponential function of operating condition p, such that $x=2*\exp(p)+3$ where exp( ) is the exponential function. Direct linear interpolation of two points $\{p_1=0, x_1=5\}$ and $\{p_3=1, x_3=8.436\}$ at $p_2=0.5$ will produce an estimate of $x_2=(x_1+x_3)/2=(5+8.436)/2=6.718$ that has 6.7% error compared to the exact value $x_2=2*\exp(0.5)+3=6.297$. This can be significantly improved by introducing a nonlinear transformation, $q=\exp(p)$ and interpolating $x=2*q+3$ with respect to q rather than p. This interpolation produces $q_2=\exp(p_2)=\exp(0.5)$ and $x_2=2*q_2+3=6.297$ with 0% error. Note that this example used a nonlinear transformation that perfectly converts the nonlinear behavior to a linear behavior so the interpolation error is reduced to zero. Actual circuit behaviors cannot always be exactly captured with a simple nonlinear function, but as long as the nonlinear function captures the major trend of the behavior, this approach will produce better results than straight linear interpolation. For example, current passing a diode is often modeled as an exponential function of the voltage.

In this example, there is a one-to-one correspondence between operating conditions $p_j$ and intermediate components $q_j$. However, this is not required. More generally speaking, there may be a different number of intermediate components $q_k$ than operating conditions $p_j$, and the intermediate components $q_k$ may be functions of multiple operating conditions $p_j$.

In an analogous (but optional) step, the circuit behaviors x(n) are also transformed 322 to intermediate results y(n):

$$y(n)=h[x(n)] \quad (2)$$

This transform h can be nonlinear and also preferably helps to linearize the relationships.

In step 314, G(n) is calculated from the Q(n). The relationship between y and Q is assumed to take the form:

$$y=G^T B \quad (3)$$

This form is a parameterized model, expressing y as a weighted combination of terms that are a function of Q. G are the individual terms and B are the corresponding weights.

In one formulation, the G terms are polynomials. Assume that operating point P is defined by two operating conditions $\{p1, p2\}$, then the parameterized model for y might be:

$$y=b_0+b_1 p_1+b_2 p_2+b_3 p_1^2+b_4 p_1 p_2+b_5 p_2^2+\ldots \quad (4)$$

where $g_0=1$, $g_1=p_1$, $g_2=p_2$, etc. G(n) is the matrix where each of these functional forms $g_1$ is calculated for each characterization point P(n). In matrix notation, $$G(n)^T B = y(n); \text{ or} \quad (5)$$

$$\begin{bmatrix} 1 & p_1(1) & p_2(1) & p_1^2(1) & p_1 p_2(1) & p_2^2(1) & \ldots & g_L(1) \\ 1 & p_1(2) & p_2(2) & p_1^2(2) & p_1 p_2(2) & p_2^2(2) & \ldots & g_L(2) \\ 1 & p_1(3) & p_2(3) & p_1^2(3) & p_1 p_2(3) & p_2^2(3) & \ldots & g_L(3) \\ \vdots & \vdots & \vdots & \vdots & \vdots & \vdots & \ddots & \vdots \\ 1 & p_1(N) & p_2(N) & p_1^2(N) & p_1 p_2(N) & p_2^2(N) & \ldots & g_L(N) \end{bmatrix} \begin{bmatrix} b_0 \\ b_1 \\ \vdots \\ b_L \end{bmatrix} =$$

$$\begin{bmatrix} y(1) \\ y(2) \\ y(3) \\ \vdots \\ y(N) \end{bmatrix}$$

Solving for the coefficients B then yields 330:

$$B=G(n)^{-1} y(n) \quad (6)$$

These coefficients can then be used in phase 350 to estimate the circuit behavior x' at operating condition P'. In many cases, it is computationally expensive to compute the coefficients B (and the corresponding matrix inverse $G(n)^{-1}$) but, once computed, they can be stored and used repeatedly to estimate the circuit behavior x' at many different operating conditions P'. In the approach of FIG. 3, coefficients B need not be recalculated for each different operating condition P'.

Phase 350 proceeds as follows. Nonlinear function F is applied 352 to the operating point P' to obtain Q', according to Eqn. 1 above. Q' is then used 354 to calculate G', also as described above. y' is calculated 356 according to Eqn. 3, using both G' and the previously calculated B. y' is then inverse transformed 362 to obtain the desired estimate x'. That is $$x'=h^{-1}[y'] \quad (7)$$

In cases where the transforms F and h are computationally expensive to compute, they may be calculated by interpolating lookup tables or via other computationally efficient approaches.

Figure 4:
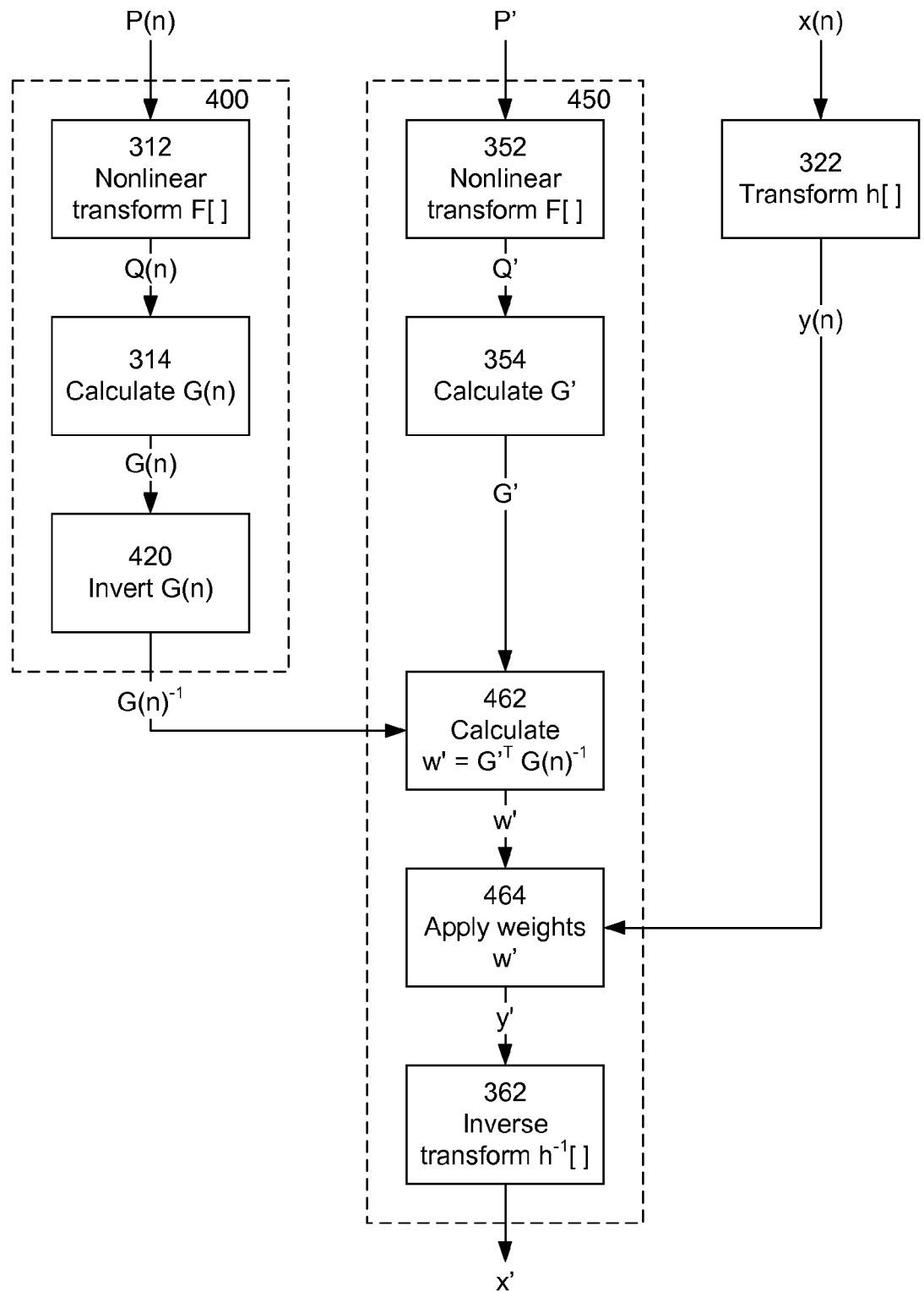
FIG. 4 is a diagram illustrating another approach to estimating circuit behavior according to the invention.

FIG. 4 is a diagram illustrating another approach to the step of estimating 240 circuit behavior according to the invention. This approach can also be divided into two phases 400 and 450. The main difference compared to FIG. 3 is that $G(n)^{-1}$ is calculated and stored, which can significantly speed up the calculation for millions of sets of data y(n) characterized for different objects at the same operating conditions.

In more detail, phase 400 calculates $G(n)^{-1}$ as follows. Steps 312 and 314 are the same as in FIG. 3. This yields G(n), which is then inverted 420 to yield $G(n)^{-1}$.

Phase 450 calculates y' based on Eqn. 3, but slightly manipulated as follows:

$$y' = G'^T B \quad (8)$$
$$= G'^T G(n)^{-1} y(n)$$

Steps 352 and 354 calculate G', as in FIG. 3. From this, a set of weights w' is calculated 462 as:

$$w'=G'^T G(n)^{-1} \quad (9)$$

The weights are applied to y(n) to produce 464:

$$y'=w'y(n) \quad (10)$$

As before, y' is inverse transformed 362 to yield the estimate x'. Other variations will be apparent.

Although the present invention has been described above with respect to several embodiments, various modifications can be made within the scope of the present invention. For example, the embodiments are presented in the context of timing, noise and power analysis with respect to characterized cell libraries. However, it is not limited to these times of analysis or to standard cell libraries. Accordingly, the disclosure of the present invention is intended to be illustrative, but not limiting, of the scope of the invention, which is set forth in the following claims.

What is claimed is:

1. A computer-implemented method for scaling a circuit behavior x in a library set to a desired operating point P' that is defined by a set of operating conditions $p_j'$, the library set containing values x(n) for the circuit behavior characterized at characterization points P(n), each characterization point P(n) defined by a set of operating conditions $p_j(n)$, the method comprising a computer system executing software instructions to effect the steps of:

estimating $G(n)^{-1}$ by:

applying a nonlinear transform to each characterization point P(n) to obtain a corresponding Q(n), wherein each Q(n) is a nonlinear transform of the characterization point P(n) and each Q(n) is defined by a set of terms $q_k(n)$; and calculating $G(n)^{-1}$ from Q(n) based on a parameterized model for y(n) of the form $y(n)=G(n)^T B$, where y(n) is a transform of the circuit behavior x(n), each G(n) is a vector of terms $g_1(n)$, each $g_1(n)$ is a functional form of a term in the parameterized model as a function of component(s) $q_k(n)$ of Q(n), and B is a vector of the corresponding coefficients for each functional form; and for the desired operating point P':

applying the nonlinear transform to P' to calculate Q' that corresponds to P';

applying the functional forms of the parameterized model to Q' to calculate G' that corresponds to Q';

calculating $y'=G'^T G(n)_{-1} y(n)$, where $^T$ indicates the transpose; and applying an inverse of the transform to y' to estimate x', the estimated circuit behavior at operating point P'.

2. The method of claim 1 wherein the circuit behavior is a circuit behavior that relates to timing.

3. The method of claim 1 wherein the circuit behavior is a circuit behavior that relates to power.

4. The method of claim 1 wherein the circuit behavior is a circuit behavior that relates to noise.

5. The method of claim 1 wherein the circuit behavior is a circuit behavior that relates to signal integrity.

6. The method of claim 1 wherein the operating conditions include voltage.

7. The method of claim 1 wherein the operating conditions include temperature.

8. The method of claim 1 wherein the operating conditions include process parameters.

9. The method of claim 1 wherein the operating conditions include voltages of multiple rails of a cell.

10. The method of claim 1 further comprising:
using the estimated circuit behavior x' to analyze timing performance of a circuit.

11. The method of claim 1 further comprising:
using the estimated circuit behavior x' to perform gate-level analysis of a circuit.

12. The method of claim 1 wherein the steps for estimating the circuit behavior x' at desired operating point P' are repeated multiple times for different desired operating points P', but without repeating the steps for estimating $G(n)^{-1}$.

13. The method of claim 1 wherein the step of applying a nonlinear transform to each characterization point P(n) to obtain Q(n) comprises applying a nonlinear transform to each operating condition $p_j(n)$ to obtain a corresponding component $q_k(n)$ where k=j.

14. The method of claim 1 wherein the step of applying a nonlinear transform comprises using a pre-calculated lookup table of the nonlinear transformation from P to Q.

15. The method of claim 1 wherein the parameterized model for y(n) is a linear combination of polynomial terms in $q_k(n)$.

16. The method of claim 1 wherein the library set includes a plurality of library files, each library file characterized at a single characterization point P(n).

17. A computer-implemented method for scaling a circuit behavior x in a library set to a desired operating point P', the method comprising a computer system executing software instructions to effect the steps of:

accessing stored data that is based on $G(n)^{-1}$, where $G(n)^{-1}$ is previously determined based on a library set that contains values x(n) for the circuit behavior characterized at characterization points P(n) and $G(n)^{-1}$ is determined in accordance with:

applying a nonlinear transform to each characterization point P(n) to obtain a corresponding Q(n), wherein each Q(n) is a nonlinear transform of the characterization point P(n) and each Q(n) is defined by a set of terms $q_k(n)$; and calculating $G(n)^{-1}$ from Q(n) based on a parameterized model for y(n) of the form $y(n)=G(n)^T B$, where y(n) is a transform of the circuit behavior x(n), each G(n) is a vector of terms $g_1(n)$, each $g_1(n)$ is a functional forms of a term in the parameterized model as a function of component(s) $q_k(n)$ of Q(n), and B is a vector of the corresponding coefficients for each functional form; and applying a nonlinear transformation to P' to calculate G', said nonlinear transformation involved in the previous determination of $G(n)^{-1}$;

using the stored data to calculate $y'=G'^T G(n)^{-1} y(n)$ where y(n) are transforms of the values x(n) and $^T$ indicates the transpose; and inverse transforming y' to obtain x', the estimated circuit behavior at operating point P'.

18. A computer-implemented method for scaling a circuit behavior x in a library set to a plurality of operating points P', the method comprising a computer system executing software instructions to effect the steps of:

determining data that is based on $G(n)^{-1}$; wherein $G(n)^{-1}$ is based on a library set that contains values x(n) for the circuit behavior characterized at characterization points P(n), in accordance with:

applying a nonlinear transform to each characterization point P(n) to obtain a corresponding Q(n), wherein each Q(n) is a nonlinear transform of the characterization point P(n) and each Q(n) is defined by a set of terms $q_k(n)$; and calculating $G(n)^{-1}$ from Q(n) based on a parameterized model for y(n) of the form $y(n)=G(n)^T B$, where y(n) is a transform of the circuit behavior x(n), each G(n) is a vector of terms $g_1(n)$, each $g_1(n)$ is a functional form of a term in the parameterized model as a function of component(s) $q_k(n)$ of Q(n), and B is a vector of the corresponding coefficients for each functional form; and without recalculating $G(n)^{-1}$, for each operating point P':
applying a nonlinear transformation to P' to calculate G', said nonlinear transformation involved in the previous determination of $G(n)^{-1}$;
calculating y' as a linear combination of G' using $G(n)^{-1}$, wherein y' corresponds to the operating point P'; and
estimating x' from y', wherein x' is the estimated circuit behavior at operating point P'.

19. The method of claim 1 wherein $G(n)=Q(n)$.

* * * * *